United States Patent [19]

Cooper

[11] 4,126,559
[45] Nov. 21, 1978

[54] PHARMACEUTICAL FILTER

[75] Inventor: Roydon B. Cooper, Locust Valley, N.Y.

[73] Assignee: Pall Corporation, Glen Cove, N.Y.

[21] Appl. No.: 823,371

[22] Filed: Aug. 10, 1977

Related U.S. Application Data

[63] Continuation of Ser. No. 671,845, Mar. 30, 1976, abandoned.

[51] Int. Cl.² ............................................. B01D 25/02
[52] U.S. Cl. ................................... 210/445; 210/448; 210/497 R
[58] Field of Search ............... 210/435, 436, 441, 445, 210/446, 450, 451, 455, 483, 484, 485, 497 R, 497.1, 448

[56] References Cited

U.S. PATENT DOCUMENTS

| | | | |
|---|---|---|---|
| 1,585,246 | 5/1926 | Hoy | 210/485 X |
| 2,808,937 | 10/1957 | O'Meara | 210/445 |
| 3,463,322 | 8/1969 | Gerarde | 210/455 |
| 3,692,186 | 9/1972 | Marzocchi | 210/497.1 |
| 3,696,932 | 10/1972 | Rosenberg | 210/446 X |
| 3,701,433 | 10/1972 | Krakauer et al. | 210/446 X |
| 3,765,537 | 10/1973 | Rosenberg | 210/446 |
| 3,856,683 | 12/1974 | Parr | 210/445 |

*Primary Examiner*—William A. Cuchlinski, Jr.

[57] ABSTRACT

A filter assembly is provided for filtering pharmaceutical fluid materials without danger of contaminating downstream effluent in the event of leakage of unfiltered fluid material past a filter seal, comprising, in combination, a filter housing comprising first and second housing parts; the first housing part having a first fluid chamber open at one side, a fluid port opening into the fluid chamber, and a peripheral sealing lip; the second housing part having a second fluid chamber open at one side, a fluid port opening into the fluid chamber and a peripheral sealing lip; sealing means between the peripheral lips; retaining means holding the housing parts and sealing means in fluid-tight juxtaposition; a filter element disposed in the second fluid chamber in the second housing part and comprising a tubular filter confined between and sealed in a fluid-tight seal to end caps at each end thereof, of which a first end cap is closed, and a second end cap has an opening therethrough communicating the interior of the tubular filter with the first fluid chamber, and a peripheral lip extending into sealing engagement with the sealing means and shaped to fit between and seal against one peripheral sealing lip of one housing part, the peripheral lip extending across and sealingly closing off the open sides of the first and second fluid chambers, so that fluid communication therebetween is restricted to the opening in the second end cap via the filter, and the leakage path at the end cap peripheral lip seal past the sealing means does not bypass the filter, but runs to the exterior of the housing between the housing parts.

15 Claims, 2 Drawing Figures

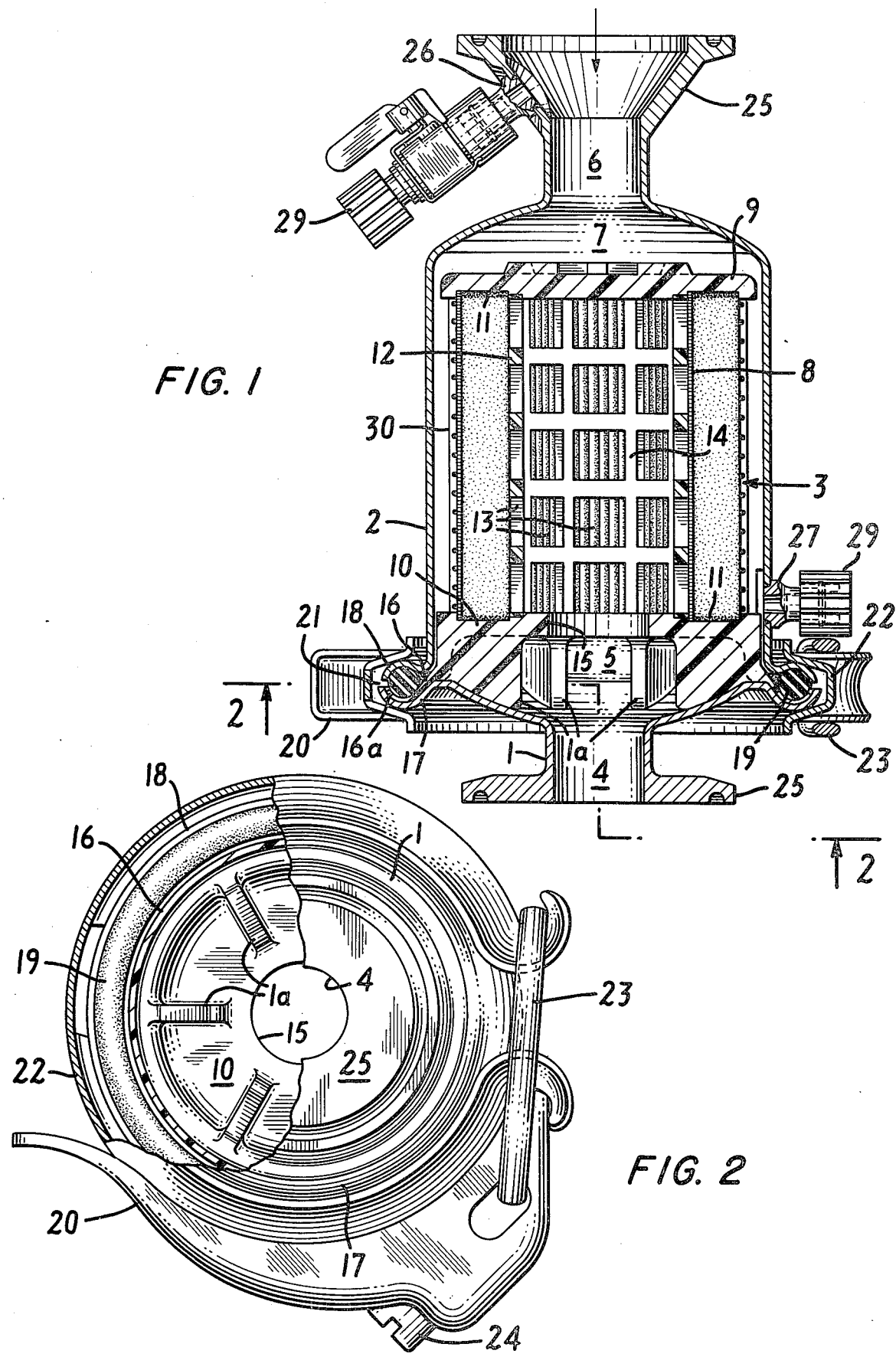

PHARMACEUTICAL FILTER

This is a continuation, of application Ser. No. 671,845, filed Mar. 30, 1976, and now abandoned.

Pharmaceutical filters must meet rigid requirements, and for this reason most designs of commercial filters are not acceptable. All portions of the filter assembly that come into contact with the fluid to be filtered must be sterile and moreover contamination of the downstream filtered effluent by unfiltered material bypassing the filter cannot be tolerated, because of the dangerous and possibly even fatal consequences to the patient, to whom the filtered pharmaceutical fluid material may eventually be aministered.

It is common practice in the pharmaceutical industry to sterilize a filter in situ in the system in which it is used. This means that the sterilizing fluid, usually steam or ethylene oxide gas, must reach every part of the filter, even on the outside of any resilient seal, due to the possibility of the seal's pumping contaminants into the system during internal pressure changes. This requirement makes unacceptable for pharmaceutical use any filter having internal resilient seals that prevent access of sterilizing gas to any part of the interior of the filter unit.

Moreover, commercial filters normally provide sealing to the filter housing in a manner to compel fluid flow through the filter, but with leakage paths at the sealing element such that unfiltered fluid bypassing the sealing element due to a faulty seal can enter and contaminate the filtered downstream effluent.

U.S. Pat. No. 3,696,932 patented Oct. 10, 1972 provides a filter design which makes impossible bypass of a filter with contamination of the downstream effluent, by providing a leakage path which extends to the outside of the housing. This leakage path is delineated between specially structured end cap and filter housing parts, and by eliminating sealing means, but relying instead upon an integrated welding or fusing of the housing and end cap component parts, where feasible, and a tapered seal between the parts where not feasible. This design has however proved expensive to manufacture, and the resulting high cost of the filter assemblies has limited their usefulness to areas where high cost can be tolerated, such as in blood filter transfusions, extracorporeal blood circulation systems, and similar applications where the life of the patient is at stake, and the cost of a filter assembly is minor compared to other aspects of the procedure.

A further design difficulty is posed by the necessity that all component parts of the filter assembly that come into contact with fluid be absolutely sterile, This requires fabrication from materials that can be made sterile without deterioration, and this precludes the usual materials of construction of commercial filter assemblies, particularly filter elements. It also precludes as well as any complications in design, such as nooks, crevices, and crannies, in which bacteria may lodge, and escape unscathed in the sterilization procedure.

In some cases, it is perfectly feasible to reuse a filter assembly after replacement of the filter element and resterilization. This requires a design which in addition is easy to assemble and disassemble, and which permits such assembly and disassembly without contamination of sterile parts, or alternatively, which permits sterilization of the completed filter assembly. This introduces other complications. Joints such as threaded cylindrical joints are not acceptable, because they provide locations where bacteria and other contamination can lodge, with such adequate protection from the sterilization conditions as to allow their survival and persistence in the presumably sterilized filter assembly.

Exemplary commercial filter designs which have interesting features but which overall are unsuitable for pharmaceutical application are those disclosed in U.S. Pat. Nos. 2,806,937 to O'Meara dated Oct. 8, 1957, No. 2,931,507 to Kent dated Apr. 5, 1960, and No. 3,856,683 to Parr dated Dec. 24, 1974.

O'Meara U.S. Pat. No. 2,808,937 provides a filter with two housing parts held together by a V-ring metal clamp, with a filter element in between. This filter has however an insufficient surface area for the volume it occupies, and is in no way suitable for fine filtration, because there is no support for the filter element against differential pressure. It is clearly intended for use only as a coarse gravity filter, in which event there is only a small proportion of material removed relative to the volume treated, as in the filtration of milk.

Kent U.S. Pat. No. 2,931,507 provides a filter for use with gases and liquids such as gasoline and oil, with a removable filter unit, but assembly and disassembly requires the removal of a number of bolts, and the device is of a rather heavy and bulky construction, and unsterilizable.

Parr U.S. Pat. No. 3,856,683 provides a dual flow fluid filter with identical filters arranged back to back with a peripheral dam therebetween, which compels fluid flow to proceed from the outside of one filter into the interior, and then into the interior of the other filter and back to the outside. This design is unsuitable where only one filter is sufficient.

In accordance with the invention, a filter assembly is provided for filtering pharmaceutical fluid materials which can be sterilized in situ in a fluid line because every portion of the interior of the assembly is accessible to sterilizing fluid, and which provides a leakage path of the filter seal to theoutside of the assembly, so that there is no danger of contaminating downstream filtered effluent with unfiltered fluid material, in the event of leakage past the filter seal.

The filter assembly in accordance with the invention comprises, in combination, a filter housing comprising first and second housing parts; the first housing part having a first fluid chamber open at one side, a fluid port opening into the fluid chamber, and a peripheral sealing lip; the second housing part having a second fluid chamber open at one side, a fluid port opening into the fluid chamber and a peripheral sealing lip; sealing means between the peripheral sealing lips; retaining means holding the housing parts and sealing means in fluid-tight juxtaposition; a filter element disposed in the second fluid chamber in the second housing part and comprising a tubular filter confined between and sealed in a fluidtight seal to end caps at each end thereof, of which a first end cap is closed, and a second end cap has an opening therethrough communicating the interior of the tubular filter with the first fluid chamber, and a peripheral lip extending into sealing engagement with the sealing means and shaped to fit between and seal against one peripheral sealing lip of one housing part, the peripheral lip extending across and sealingly closing off the open sides of the first and second fluid chambers, so that fluid communication therebetween is restricted to the opening in the second end cap via the filter, and the leakage path at the end cap peripheral lip seal past the sealing means does not bypass the filter but runs to the exterior of the housing A preferred embodiment of the invention is illustrated in the drawings, in which:

FIG. 1 represents a longitudinal section through a filter assembly in accordance with the invention, and FIG. 2 represents a cross-sectional view taken along the line 2—2 of FIG. 1, and showing the ribbed portion of one end cap of the filter.

The filter assembly shown in FIGS. 1 and 2 comprises a first, normally the bottom; housing part 1, a second, normally the top, housing part 2, and a filter element 3 disposed in the second housing part 2. The first housing part 1 has a fluid port 4, leading into a first fluid chamber 5. The second housing part 2 has a fluid port 6, leading into a second fluid chamber 7.

In the arrangement shown, the fluid port 6 would normally be the unfiltered fluid inlet into the housing, and the fluid chamber 7 the upstream unfiltered fluid chamber. The fluid chamber 5 would receive filtered fluid from the filter, and the fluid port 4 would serve as the filtered fluid outlet port from the housing. However, the reverse is also possible, with flow in the reverse direction. Also, the housing part 1 can be at the top, and part 2 at the bottom; the assembly can also be arranged horizontally, or at any desired angle to the horizontal or vertical.

The filter element 3 comprises a tubular filter 8 confined between end caps 9,10, each sealed to the ends of the filter tube 8 by a potting compound 11. The filter 8 in this case a bacteria proof filter, pore size absolute less than 0.3 micron, such as a membrane or porous plastic sheet, is supported on an internal core 12, in this case a tube made of polypropylene or other plastic, with a number of ports 13 therethrough, for flow of fluid passing through the filter 8, into or out from the interior chamber 14 of the filter 8. The exterior of the filter is confined within a wrap 30 of extruded polypropylene or other plastic netting such as Vexar.

It will now be seen that the chamber 5 is in fluid communication with the interior chamber 14 of the tubular filter by way of the aperture 15 in the end cap 10. Since the end cap 9 closes off the other end of the tubular filter, fluid flow between the chambers 5 and 7 and the filter 8 is only via the interior chamber 14 of the filter 8.

The end cap 10 has a peripheral lip 16 that extends all the way across the chamber 7, closing off that side of the chamber. The peripheral lips 17,18 of the housing parts 1,2 are each indented so as to embrace a sealing ring 19, such as a conventional O-ring of rubber or other resilient material, and it will be noted that the terminal end portion 16a of the lip 16 of the end cap 10 is also curved so as to fit against the interior wall of the flange 17, between it and the ring 19, thus sealing off the chamber 7 at the ring 19.

It will now be apparent that because of the lip 16 the fluid chambers 5,7 are effectively separated against fluid flow therebetween, except through the filter 8 and the open interior 14 of the filter. The extension 16a of the lip 16 into sealing juxtaposition to the sealing ring 19 ensures that any leakage that may arise at the seal cannot bypass the end cap 10 and its lip 16, but instead passes to the exterior of the filter housing between the two housing parts 1,2, at their lips 17,18, through the opening 21 therebetween.

The two housing parts 1,2, at their lips 17,18, are held in sealing relation against the O-ring 19 and the lip 16 of the end cap 10 by the V-ring clamp 22. The legs of the V-ring are spread apart, forming a tapered clamp at the junction of the two housing parts. The clamp 22 is provided with a lever-actuated toggle 23, and extends about the circumference of the joint. Closure is completed by snapping the lever 20 back, and released by snapping the lever open. Adjustment of the clamping action can be provided by shortening or lengthening the clamp by the adjustment screw 24. The toggle action clamp is of conventional type, and forms no part of the invention, but it does provide a certain secure seal at the joint between the two housing parts.

Each of the ports 4,6 is provided with a standardized connection 25, for attachment to a fluid line.

The housing part 2 is also provided with a port 26, serving as a vent, drain or inlet feet port, and a port 27 serving as a vent, drain or inlet feed port, but these are not essential, and either or both can be omitted. For convenience, the ports 26,27 can be provided with Luer fittings or Pharmaseal fittings, for reception of containers or delivery means with standardized mating Luer or Pharmaseal fittings. The ports 26,27 are also provided with caps 29, so that they can be kept normally closed, but opened when desired, such as to vent air via port 26 from within the chamber 7 at the time the filter is filled (possibly via port 27) preparatory to being put onstream.

Instead of a cap, the port 27 can be fitted with a valve optionally provided with a Luer fitting, for sampling of fluid within the chambers 7 and 5 while it is onstream, or so as to ascertain when contamination build-up requires removal of the filter from service.

Assembly and disassembly of the filter is quite simple. The clamp 22 is removed, whereupon the housing part 2 can simply be lifted off, exposing the filter element 3. This can be removed after removing the O-ring seal 19, and replaced, after which the housing part 2 can again be put in position, and the clamp 22 reimposed. project outwardly into chamber 5 (as seen in FIG. 2), and come into juxtaposition to or even into contact with the surface of the housing part 1. These help to retain the end cap 10 and with it the filter element 3 in position under high differential fluid pressure applied from the upstream unfiltered side of the filter element, and relieve strain on the lips 16,16a of the end cap that might lead to distortion and rupture of the seal. Further support for the filter 8 against such differential fluid pressure is provided by the internal core 12 and outer wrap 30, preventing distortion or blow out of the filter under high differential pressure, such as might develop with heavy contaminant loading, in either direction of flow through the filter.

In normal use, fluid flow would be as indicated by the arrow, via port 6 as inlet, to port 4 as outlet, since the exterior surface of the filter 8 has a larger available volume than the interior, for collection of contaminants removed by the filter. However, if the volume of contaminants to be removed is not unduly great, fluid flow can equally well proceed via port 4 as inlet to port 6 as outlet, with the contaminants being collected on the inside surface of the filter. Under such reverse flow, since the differential fluid pressure is applied against the inside of the filter, the external supporting sheath 30 about the exterior of the filter 8, assumes the function of the internal core 12.

The filter assembly of the invention is not position-sensitive, and can be oriented as desired, horizontally, vertically, or at any selected angle to the horizontal or vertical. Normally, however, the filter assembly will be oriented as shown in the drawings, with the housing part 2 uppermost.

The housing parts can be formed of any desired material. For use as a pharmaceutical filter, all parts must be sterilizable. Inert metals not susceptible to corrosion or attack by the pharmaceutical fluid being filtered can be used, of which stainless steel is preferable, and aluminum and nickel-chromium alloys also acceptable. Plastic materials which are sufficiently rigid to be capable of retaining their dimensions under pressure, and inert enough to withstand the sterilization procedures, can also be used, and will be found preferable in many instances because of their ease of fabrication by molding to any desired configuration. Suitable plastic materials include polyesters, polycarbonates, polyoxymethylene resins, polyamides, phenylformaldehyde resins, polytetrafluoroethylene, polychlorotrifluoroethylene, polypropylene, polyethylene, polybutylene and polysulfones.

The filter will be of a material selected to withstand attack by the pharmaceutical fluid being filtered, and also withstand the internal pressure of the system, while at the same time being sufficiently inert to withstand sterilization procedures. Metal and plastic can be used. Metallic wire mesh, such as stainless steel mesh, aluminum wire mesh, and similar inert metallic wire materials can be used. Plastic monofilament mesh is also suitable, such as, for example, nylon mesh, polypropylene mesh, and polyester mesh (particularly the polyester mesh described and claimed in U.S. Pat. Nos. 3,701,433, 3,765,537, and 3,765,536, patented, respectively, Oct. 21, 1972, Oct. 16, 1973, and Oct. 16, 1973).

The pore size of the filter can be as large or as small as required, ranging from as low as about 0.01 micron up to about 1,000 microns and more. It is frequently desirable to use a plurality of filter layers of differing porosity, usually with the porosity decreasing in the direction of flow, as in the filter cascades of U.S. Pat. Nos. 3,765,537 and 3,765,536.

For pharamceutical uses, the filter should be capable of removing bacteria. This requires an absolute pore size below 0.3 micron. For this purpose, porous membranes and sheets of plastic are preferred.

Suitable materials are described in U.S. Pat. Nos. 3,238,056, 3,246,767, 3,353,682, 3,573,158 and 3,696,932, patented, respectively, Mar. 1, 1966, Apr. 19, 1966, Nov. 21, 1967, Mar. 30, 1971, and Oct. 10, 1972.

It is quite advantageous to form the housing, end caps and filter of the same plastic material, such as polypropylene, polyamide, or polytetrafluoroethylene.

It will be apparent that the filter assembly of the invention possesses numerous advantages, particularly adapting it for use as a pharmaceutical filter. The filter element end cap with an integrally molded sealing lip eliminates the necessity for internal seals, and provides an acceptable sanitary sterile closure. In the event of a damaged or faulty seal, it is impossible for downstream filtered effluent to be contaminated by upstream unfiltered influent, since there is no internal leakage path. The lips of the two housing parts are formed to mate precisely with the sealing means and the sealing lip of the end cap, thus providing positive sealing with a minimum of clamping force, since there are no internal fittings or glands. The interior surfaces of all the filter assembly parts are completely and easily accessible, for positive sterilization and sanitary cleaning. The sealing means and the ribbed configuration of the element end cap downstream of the filter are precisely mated, so as to guarantee the integrity of the filter element under the most rigorous operating conditions. The applicability of Luer-lok and/or Pharmaseal fittings to the line vent and drain connections make the assembly adaptable for connection to any kind of standardized receptacle or delivery polished dies, precisely finished and polished, a housing of superior appearance and cleanability is obtained.

Having regard to the foregoing disclosure, the following is claimed as inventive and patentable embodiments thereof:

1. A filter assembly free from internal seals but having a replaceable filter element, for filtering pharmaceutical fluid materials without danger of microorganism contamination of downstream filter effluent, comprising, in combination, a filter housing comprising first and second housing parts; the first housing part having a first fluid chamber open at one side, a fluid port opening into the fluid chamber, and a peripheral sealing lip; the second housing part having a second fluid chamber open at one side, a fluid port opening into the fluid chamber, and a peripheral sealing lip; sealing means between the peripheral lips and sealing with at least one of the peripheral lips against leakage to the exterior of the filter housing; retaining means holding the peripheral lips of the housing parts and sealing means in fluid-tight sealing juxtaposition; a filter element disposed in the second fluid chamber in the second housing part and comprising a tubular filter confined between and permanently sealed in a fluid-tight seal to end caps at each end thereof, of which a first end cap is closed and a second end cap has an opening therethrough communicating the interior of the tubular filter with the first fluid chamber, and a peripheral lip integral with the second end cap and extending into sealing engagement on one side with one side of the sealing means, and shaped to fit between and seal on its other side against one side of one peripheral sealing flange of the other housing part, the peripheral lip extending across and closing off the open sides of the first and second fluid chambers without any internal seal, so that fluid communication therebetween is restricted to the opening in the second end cap via the filter, and the leakage paths at the end cap, integral peripheral lip seal, and housing part peripheral lips past the sealing means do not bypass the filter, but run to the exterior of the housing between the housing parts, so that there are no internal seal leakage paths.

2. A filter assembly in accordance with claim 1, in which the housing parts, sealing means and filter end cap lip are held together in a leak-tight seal by a V-ring clamp.

3. A filter assembly in accordance with claim 1, in which the sealing means is an O-ring seal.

4. A filter assembly in accordance with claim 1, in which the second end cap and peripheral flange are integrally molded together in one piece of plastic material.

5. A filter assembly in accordance with claim 1, in which the second housing part is provided with a vent opening into an upper portion of the second chamber.

6. A filter assembly in accordance with claim 1 in which the second housing part is provided with a drain opening into a lower portion of the second chamber.

7. A filter assembly in accordance with claim 1 in which the first housing part has internally extending projections contacting and supporting the second end cap of the filter element in the second housing, and retaining the element in position against differential fluid pressure applied to the filter under flow from the second housing part in a direction to the first housing part.

8. A filter assembly in accordance with claim 1 in which the housing parts are formed of molded plastic.

9. A filter assembly in accordance with claim 1 in which the filter is a plastic membrane.

10. A filter assembly in accordance with claim 1 in which the filter has a pore size of less than $0.3\mu$ absolute.

11. A filter assembly in accordance with claim 1 in which the filter is supported on an internal core.

12. A filter assembly in accordance with claim 1 in which the filter comprises a multiplicity of filters of differing pore size, arranged in the order of decreasing pore size in the direction of fluid flow through the filter element.

13. A filter assembly in accordance with claim 1 in which the filter is supported within an external sheath.

14. A filter assembly in accordance with claim 1 in which the peripheral lip on the second end cap extends across the sealing means in a manner to prevent a seal between the sealing means and each housing part, so as to maintain a leakage path beyond the sealing means to the exterior of the housing.

15. A filter assembly in accordance with claim 1 in which the sealing means is an O-ring.

* * * * *

UNITED STATES PATENT OFFICE
CERTIFICATE OF CORRECTION

Patent No. 4,126,559

Dated November 21, 1978

Inventor(s) Roydon B. Cooper

It is certified that error appears in the above-identified patent and that said Letters Patent are hereby corrected as shown below:

Column 1, line 15, "aministered" should be --administered--.

Column 2, line 9, "2,806,937" should be --2,808,937--.

Column 2, line 40, "of", first occurrence, should be --at--.

Column 2, line 40, "theoutside" should be --the outside--.

Column 3, line 2, insert --between the housing parts.-- after "housing".

Column 4, line 16, "feet" should be --feed--.

Column 4, line 38, insert --The end cap 10 is provided with a plurality of external ribs 1a, which-- as the beginning of a new paragraph before "project".

Column 5, line 41, "pharamceutical" should be --pharmaceutical--.

Column 5, line 49, insert --,-- after "caps".

UNITED STATES PATENT OFFICE
CERTIFICATE OF CORRECTION

Patent No. 4,126,559          Dated November 21, 1978

Inventor(s) Roydon B. Cooper

It is certified that error appears in the above-identified patent and that said Letters Patent are hereby corrected as shown below:

Column 6, line 7, insert --means. If the housing parts and filter element end caps are prepared in-- after "delivery".

Signed and Sealed this

Ninth Day of October 1979

[SEAL]

Attest:

RUTH C. MASON  
Attesting Officer

LUTRELLE F. PARKER  
Acting Commissioner of Patents and Trademarks